Feb. 15, 1927.
H. A. MEYER
1,617,410
CARCASS CUTTER
Filed Aug. 20, 1926
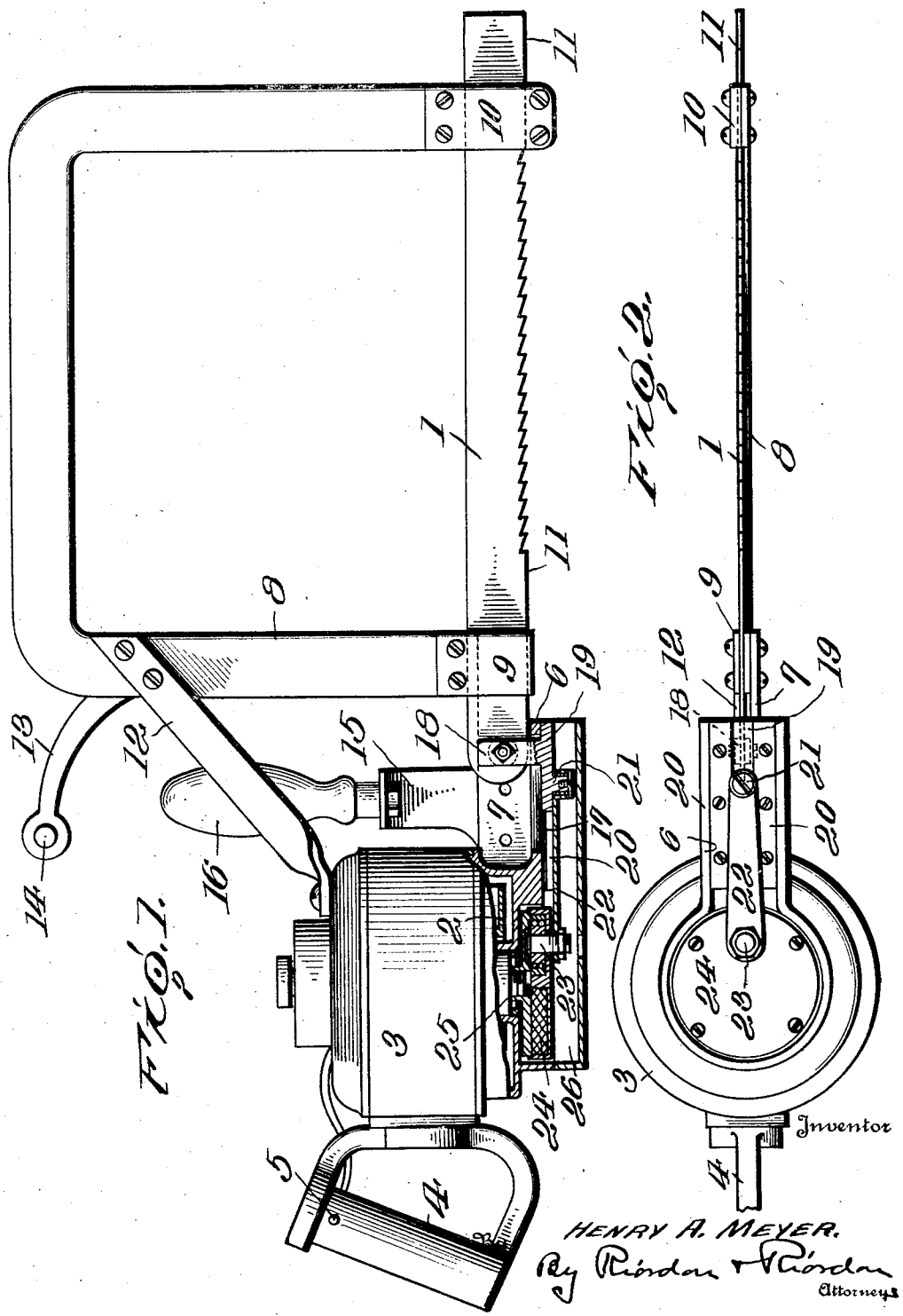
Inventor
HENRY A. MEYER.
By Riordan & Riordan
Attorneys Patented Feb. 15, 1927.

1,617,410

UNITED STATES PATENT OFFICE.

HENRY A. MEYER, OF CINCINNATI, OHIO, ASSIGNOR TO THE WOLF MACHINE COMPANY, OF CINCINNATI, OHIO, A CORPORATION OF OHIO.

CARCASS CUTTER.

Application filed August 20, 1926. Serial No. 130,497.

This invention relates to carcass splitting machines and has for its object the provision of a machine which may be driven by electric power, may be cheaply manufactured, easily handled, and the efficient manipulation of which may be quickly acquired by hand-saw operators.

The object of the invention is attained in such an apparatus as is illustrated in the accompanying drawing, and the invention resides in certain novel features which will be particularly defined in the claims following a detailed description.

In the drawing:

Fig. 1, is a side elevation, partly broken away and in section, of a machine embodying the invention;

Fig. 2, is a bottom plan view.

The machine includes a saw 1 and a motor 2, preferably electric, for driving the saw. The motor is mounted within a casing or motor frame 3, which is provided at its rear with a handle 4 carrying the motor switch which may be of any approved form and is indicated conventionally at 5. The motor frame or casing is formed with a forwardly projecting radial arm 6, and to one side of this arm is secured a plate or flange 7 which extends beyond the end of the arm and has one end of the saw-guiding frame 8 secured thereto. The frame 8 may conveniently be a flat bar having the general form of an inverted U in side view and to the sides of the legs of the frame, at the ends thereof, are secured lugs 9 and 10, which are offset or grooved so that the saw may be received between the opposed faces of the frame and lugs to be guided thereby. It will be noted that the working edge of the saw is smooth at its ends, as shown at 11, and the lug 10 may be so formed as to pass under the saw and provide a rest and support for the free end of the saw. A brace 12 extends between and is firmly secured to the upper rear corner of the frame 8 and the top of the motor casing to rigidly connect the same and resist lateral strain and bending tendencies in the saw-guiding frame. A rearwardly projecting arm 13 is provided at the upper rear corner of the frame 8, and at the end of this arm is an eye 14 in which a suspending cable (not shown) is secured. It is to be understood that the machine is suspended by a counterweighted cable passing over a pulley on the carcass-carrying trolley in accordance with established packing house practice.

To the outer side of the plate or flange 7 is secured an upstanding bracket 15 carrying a handle 16.

Through the arm 6 is formed a longitudinal slot 17 in which lays a pin or lug 18 rising from a crosshead 19, which is arranged immediately below the arm 6 and is slidably mounted in and between ways 20 on the under side of the arm. On the under side of the crosshead is a stud 21 which is pivotally fitted in one end of a pitman 22, the opposite end of said pitman being pivotally mounted on a wrist-pin 23 carried by a combined crank and fly-wheel 24 secured to the lower end of the motor shaft 25.

A cover 26 is secured to the bottom of the motor casing to enclose the working parts and protect them from chance blows and accumulations of dust or other matter.

In the packing house industry, it is customary to suspend a carcass head downward on a trolley for convenience in dividing, and the carcass is divided longitudinally into two halves by sawing from the rump downward for a distance of about one foot, and then splitting the remaining length of the carcass by the use of a cleaver. Machines have heretofore been provided for making the initial division but they generally employ rotating circular saws and are costly and heavy so that they are difficult to handle, and, because of the expense of installation the danger incident to the use of circular rotating saws, and the weight, many plants use hand saws.

My invention provides a light easily manipulated machine which may be produced at a low cost and is safe to operate.

The handles 4 and 16 enable the operator to easily guide the machine through the carcass and to adjust it both vertically and horizontally. Inasmuch as a reciprocating saw is employed, users of handsaws quickly learn to manipulate the machine and the danger attendant upon the use of rotary saws is eliminated. The saw frame provides a firm support and guide for the saw and is so designed that the carcass may be cut to the usual depth without any part of the machine, except the saw blade, entering the cut, less power being required consequently to run the machine and a clean cut being made with minimum mutilation of the flesh.

Having thus described my invention, what

I claim as new and desire to secure by Letters Patent of the United States is:

1. In a carcass-dividing machine, the combination of a motor, a casing for the motor, a supporting frame or bed plate, a saw-guiding frame rigidly connected with the bed plate, a saw blade, said frame having guides in which the ends of said blade are freely reciprocable, and operative connections between the saw and the motor.

2. In a carcass-dividing machine, the combination of a motor casing, a motor therein, a handle on the rear of the motor casing, an arm projecting forwardly from the casing, a handle rising from said arm, a frame having depending guides and rigidly secured to the arm, a saw mounted for free reciprocation in the guides, and operative connections between the motor and the saw.

3. In a carcass-dividing machine, the combination of an inverted U-shaped frame, guides at the ends of the frame, a blade mounted for free reciprocation in the guides, and means for operating the saw.

4. In a carcass-dividing machine, the combination of a motor casing, a motor therein, an arm projecting forwardly from the motor casing, a frame rigidly connected to the arm, a rigid brace extending between the top of the motor casing and the frame, said frame having depending guides in which the ends of the saw are freely reciprocable, and connections between the saw and the motor whereby the saw will be reciprocated.

5. In a carcass-dividing machine, the combination of a motor casing, a motor therein, an arm projecting from the casing and having a longitudinal slot, ways on the under side of the arm, a crosshead mounted in said ways, a pin rising from the crosshead through the slot in the arm, a saw secured to said pin, a fly and crank wheel driven directly by the motor and disposed at the bottom of the motor casing, and a pitman connecting the fly and crank wheel with the crosshead, a yoke rigidly attached to said arm and having guides in which the saw blade is freely reciprocable.

6. In a carcass dividing machine, the combination of a frame, a power driven cutter and a yoke with depending guides in which the ends of the cutter may freely reciprocate, said yoke being rigidly secured to the frame.

In testimony whereof I hereunto affix my signature.

HENRY A. MEYER.